UNITED STATES PATENT OFFICE.

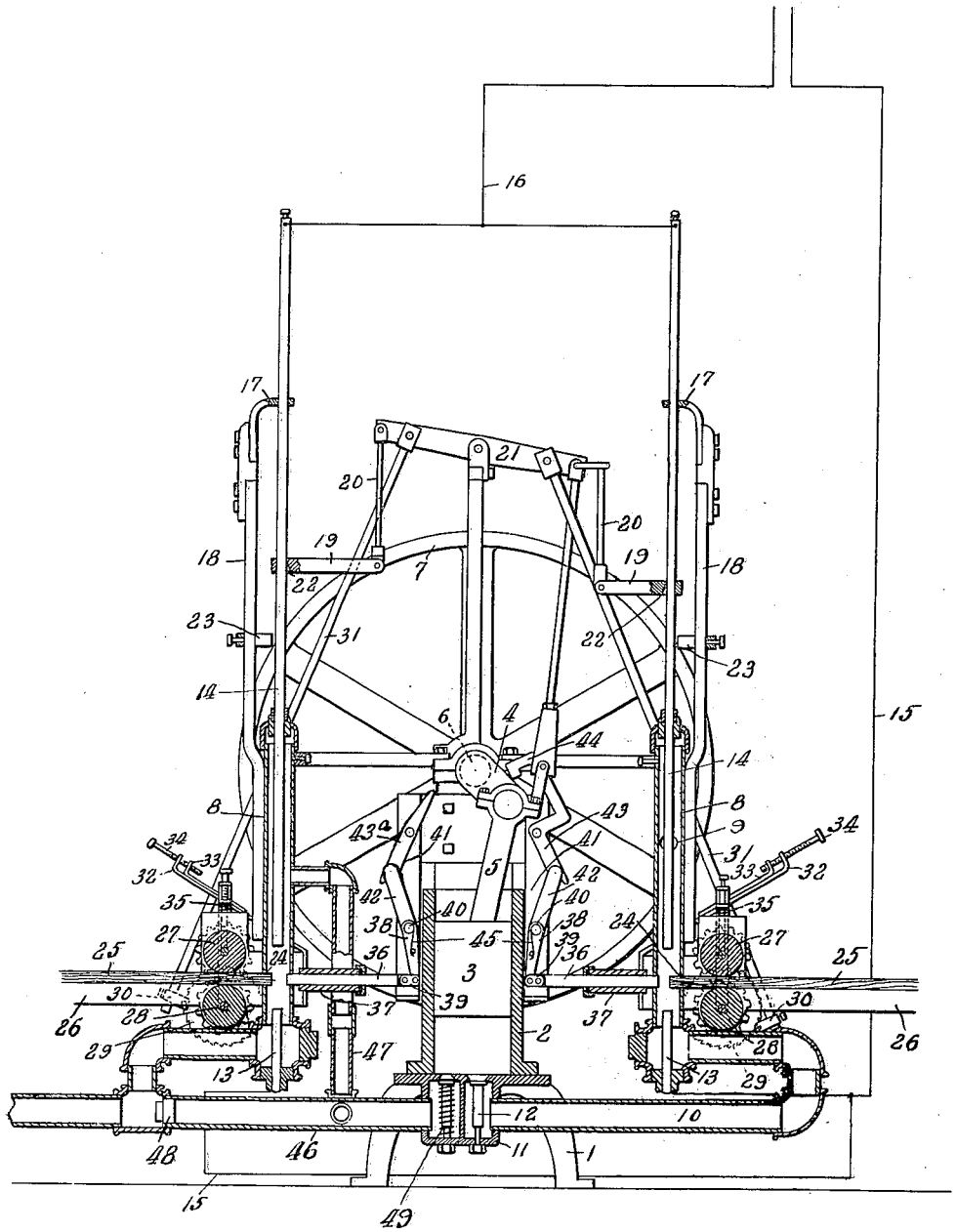

JAMES N. ALSOP, OF OWENSBORO, KENTUCKY, ASSIGNOR TO ALSOP ELECTRICAL COMPANY, OF OWENSBORO, KENTUCKY, A CORPORATION OF KENTUCKY.

METHOD OF PRODUCING GAS.

1,060,410.  Specification of Letters Patent.  Patented Apr. 29, 1913.

Application filed November 9, 1910. Serial No. 591,503.

*To all whom it may concern:*

Be it known that I, JAMES N. ALSOP, a citizen of the United States, residing at Owensboro, in the county of Daviess and State of Kentucky, have invented new and useful Improvement in Methods of Producing Gas, of which the following is a specification.

I have discovered that by subjecting atmospheric air to the influence of an electric arc, vaporizing organic substances, and mixing the two gaseous products while the treated air possesses characteristics imposed upon it by the electric arc, a useful gas is produced, which may, among other uses, be advantageously employed for the preservation of fresh meats. In producing this gas, I prefer to simultaneously subject atmospheric air and the organic substance to the influence of an electric arc, which thus serves not only to act upon the air, but to vaporize the organic substance; or to utilize the intense heat of the gaseous product resulting from the action of the arc upon atmospheric air to vaporize the organic substance.

I do not wish to be restricted to my understanding of the chemical or electro-chemical action which is manifested in the production of the gas nor to the chemical constituents of the gas, but I have reason to believe that the constituents of the treated atmospheric air are caused to combine more or less, resulting in a dilute nitrous gas in a state of ionization, and that the organic substance is vaporized or gasified, and in a state of ionization; and that when brought together in such state, or at least while the dilute nitrous acid gas is in such state, a chemical union of the two gases takes place. The resulting gas probably differs in its constituents, dependent upon the particular organic substance employed; but such gases have at least a general identity in their properties as being preservative. I prefer to use as the organic substance a vegetable organism, especially wood. I have used hickory, oak and pine with excellent results. The vapors of these substances, in part at least, are condensable at ordinary temperatures, and therefore the vapors which, in accordance with this invention, are brought into contact with atmospheric air subjected to the action of an electric arc include those vapors which are, as stated, condensable at ordinary temperatures.

The resulting gas produced by the method of my invention may be subjected to a succession of treatments by the electric arc if desired, and such treatments result in strengthening or concentrating the gas.

In the accompanying drawing I have shown one suitable type of apparatus organized for subjecting the gas resulting from treatment in one arc to subsequent treatment by another, and it will be understood that this treatment may be added to by treatment with additional arcs.

The apparatus shown is one which I have employed and which I prefer, but it will be understood that the method of producing the gas may be carried out by altogether different apparatus. A description of the preferred apparatus shown, and that which takes place therein, will be a disclosure of the method practised.

Referring to said drawing, the reference numeral 1 designates a suitable base or support upon which is mounted the cylinder 2 of a pump within which works a piston 3 that may be conveniently reciprocated by a crank arm 4 connected to the rod 5 of the piston, and mounted upon a rotary shaft 6 that carries a suitable driving pulley 7, which may be driven from any suitable source of power.

The numeral 8 designates the chamber in which the reaction takes place, and as shown, consists of a vertically disposed tube, that which I have employed being constructed of iron lined with the refractory substance asbestos. An intake opening 9 is provided in this tube, open to the atmosphere, and the tube is in communication with the pump cylinder by means of a piping system 10, rigidly connected to the valve casing 11 supported by the base 1 to serve as a support for the treating chamber 8. In the valve casing is arranged a suitable check valve 12 which permits the pump piston to draw air through the treating chamber 8 to be subjected to the action of the electric arc therein on the suction stroke of the piston, and closes the port on the return stroke thereof, so that a substantially continuous current of air is established and maintained. Within the treating chamber, in the particular apparatus shown, although I do not confine myself thereto, is a stationary electrode 13 and a reciprocating electrode 14, those which I have employed having been of iron, suitably mounted and insulated in any of the ways known to the electrical art. The electrodes are connected to the positive and negative ends of a source of electricity, as indicated by the numerals 15, 16.

In practice I have employed a dynamo having a choking coil in circuit, and have employed a current of voltage approximating five hundred volts and an amperage of two to three amperes at the arc. The apparatus and electrical conditions in this respect are substantially those set forth in the Letters Patent granted to me the 29th day of May, 1904, No 758,883, to which reference is made for these particulars, and which therefore are not herein shown.

The movable electrode 14 may be reciprocated by any convenient means, and I have shown it as passing through a guide eye 17 carried by a standard 18 supported by the wall of the treating chamber 8. The electrode is gripped by an arm 19 pivotally connected by a link 20 to one end of a walking beam 21. The electrode gripping arm 19 has a perforation 22 through its free end to receive and grip the electrode to impart reciprocatory movement thereto from the movement of the walking beam. To feed the electrode as it is consumed an abutment 23 carried by the standard 18 is arranged in the path of movement of the gripper arm so that at each forward reciprocation of the electrode the abutment engages the gripping arm, turns it upon its pivotal point with the link 20, and by reason of the flaring wall of the perforation 22 frees the electrode from the gripping arm and allows it to feed. The object of this arrangement is to produce an arc of the character set forth in my before-mentioned last Letters Patent, that is to say, generally to bring the movable electrode into contact with the stationary one to strike the arc, so that a low amperage may be employed, then move it away to elongate the arc until it breaks, a rapid succession of arcs being made and broken during the operation of the apparatus. I do not, however, confine myself to this particular character of arc, as a stable arc now well known in the electro-chemical art may well serve the purpose.

The treating chamber 8 is provided in the zone of the arc with a passage 24 through which the organic substance, which I have represented in the drawing as a slab of wood 25, may be projected into the path of the arc to be acted upon by the arc in the presence of the atmospheric air or the products resulting therefrom by the action of the arc. As shown, this organic substance, wood, is supported upon a table 26 and arranged to engage and feed the same to the arc are upper and lower rollers 27, 28, having intermeshing gear, the lower one of which is provided with a ratchet 29 with the teeth of which engages a pawl 30 carried by a pitman 31 connected to the walking beam 21, to intermittently feed a definite portion of the wood to the arc.

The amount of feed is capable of variation according to desire. A suitable means by which this may be accomplished is illustrated in the drawing, wherein the pitman 31 passes through a slot in a guide 32 upon which is mounted a slotted gage 33 through which slot the pitman also passes. An adjusting screw 34 is provided engaging the guide and the gage so that the pitman may be adjusted to reciprocate in paths differing in radial distance from the axis of the ratchet, and thus rotate the latter correspondingly different distances, for a greater or less feed as may be desired.

The upper roller 27 is arranged in an open bearing, and a spring 35 bears against its shaft or pintle so that it is yieldingly mounted, being caused to effectively coöperate with the roller 28 to feed the slab of wood, and at the same time capable of yielding to compensate for inequalities thereof or to accommodate slabs of different thickness.

The operation of the mechanism is timed, so that the organic substance is fed into the field of influence of the arc or the hot gases produced by the arc immediately after the latter has been struck and during the period of its elongation, and is retracted just after the arc breaks. To insure that the end of the organic substance which is exposed in the treating chamber to be vaporized will assume each time it is projected the same relative relation to the arc, or the hot gases produced thereby, suitable means are provided to accurately position the wood each time it is withdrawn after the arc is broken, so that if the feed be regular the consideration mentioned will be accomplished. This means, as shown, consists of a pusher 36 passing through a guide tube 37 and pivotally connected to an arm 38 by a link 39. The arm 38 is fixed to a rocking stud shaft 40 carried by a support 41 supported by the pump cylinder. The stud shaft is rocked, conveniently, by means of an arm 42 having a pin fitting in the forked end of a lever 43 pivotally mounted on the support 41, and having its free end 44 arranged in the path of movement of the crank arm 4 to be engaged thereby during each rotation of the latter to project the pusher into engagement with the slab of wood for the purpose above mentioned, after which the pusher is retracted, conveniently, by means of a spring 45, shown as a flat spring, one end of which is connected to the support 41 and the other to the rock shaft 40. The movement of these parts is so timid that when, or immediately after, the arc is broken, the pusher is operated to position the organic substance, wood, accurately for the next feed thereof as above set forth. The product thus obtained is drawn into the pump cylinder and may be discharged therefrom for immediate use in treating fresh meats or preserving the same, or conveyed to a place of storage for future use, as the preservative characteristic of the gas exists for an appreciable length of time. I have found the gas useful in curing hides, and as a therapeutic agent, for which specific uses separate applications for Letters Patent may be made.

As above explained, however, the apparatus shown is organized for subjecting the gaseous product from the first tube 8 to the action of a second arc, and for this purpose the pump cylinder is in communication with a piping system 46 which is rigidly supported by the valve casing 11, so that it may in turn support the second treating chamber 8, and for the purposes of this support the piping system comprises a branch 47 leading into the second treating chamber 8, and is plugged as shown at 48 to compel passage through the branch 47. The communication between the pump cylinder and the piping system is controlled by a check valve 49. The mechanism appropriate to this second chamber is exactly like that which has been described with reference to the first chamber, and is indicated correspondingly by the numerals in the drawing, except that the form of the lever 43ª differs from that of the lever 43, so that it may be appropriately acted upon by the crank arm 4. The treatment in the second chamber, as stated, strengthens the resulting gas or increases its concentration, and may be extended by treatment by any desired number of subsequent arcs.

What I claim is:—

1. A method of producing a preservative gas which consists in subjecting atmospheric air to the action of an electric arc, and bringing into contact therewith the vapor of an organic substance.

2. A method of producing gas which consists in subjecting atmospheric air to the action of an electric arc, and bringing into contact therewith vapors of an organic substance, some of which at least, are condensable at ordinary temperatures.

3. A method of producing a gas which consists in subjecting atmospheric air to the action of an electric arc, and bringing into contact therewith the vapor of a vegetable substance.

4. A method of producing a gas which consists in subjecting atmospheric air to the action of an electric arc, and bringing into contact therewith the vapor of wood.

5. A method of producing a preservative gas which consists in subjecting atmospheric air to the action of an electric arc, and while the same is in a state of ionization bringing into contact therewith the vapor of an organic substance.

6. A method of producing a gas which consists in subjecting atmospheric air to the action of an electric arc, and while the same is in a state of ionization bringing into contact therewith the vapor of a vegetable substance.

7. A method of producing a gas which consists in subjecting atmospheric air to the action of an electric arc, and while the same is in a state of ionization bringing into contact therewith the vapor of wood.

8. A method of producing a preservative gas which consists in subjecting atmospheric air and an organic substance in the presence of each other to the action of an electric arc.

9. A method of producing a preservative gas which consists in subjecting atmospheric air and an organic substance simultaneously to the action of an electric arc.

10. A method of producing a gas which consists in subjecting atmospheric air and a vegetable substance to the action of an electric arc.

11. A method of producing a gas which consists in subjecting atmospheric air and wood to the action of an electric arc.

In testimony whereof I have hereunto set my hand in presence of two subscribing witnesses.

JAMES N. ALSOP.

Witnesses:
JAMES L. CRAWFORD,
GEO. W. REA.